(12) United States Patent
Kim et al.

(10) Patent No.: US 11,552,526 B2
(45) Date of Patent: Jan. 10, 2023

(54) ELECTRIC ACTUATOR ASSEMBLY WITH A BRUSH CARD ASSEMBLY

(71) Applicant: KEYANG ELECTRIC MACHINERY CO., LTD., Seoul (KR)

(72) Inventors: Seong soo Kim, Hwaseong-si (KR); Seung tae Yun, Ansan-si (KR); Jin seok Lee, Ansan-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 152 days.

(21) Appl. No.: 17/091,287

(22) Filed: Nov. 6, 2020

(65) Prior Publication Data
US 2021/0152048 A1    May 20, 2021

(30) Foreign Application Priority Data
Nov. 19, 2019   (KR) .......................... 10-2019-0149069

(51) Int. Cl.
*H02K 5/14* (2006.01)
*H02K 5/22* (2006.01)
*H02K 7/116* (2006.01)
*H02K 5/24* (2006.01)

(52) U.S. Cl.
CPC ............. *H02K 5/225* (2013.01); *H02K 5/148* (2013.01); *H02K 5/24* (2013.01); *H02K 7/1166* (2013.01)

(58) Field of Classification Search
CPC ........ H02K 5/143; H02K 5/148; H02K 5/225; H02K 7/1163; H02K 7/1166; H02K 13/00; H02K 11/026; H02K 11/38
See application file for complete search history.

(56) References Cited

U.S. PATENT DOCUMENTS

| | | | |
|---|---|---|---|
| 5,717,271 A * | 2/1998 | Aoki ..................... | H01R 39/40 310/239 |
| 2007/0103013 A1 | 5/2007 | Sakohira et al. | |
| 2012/0139371 A1* | 6/2012 | Gottschalk ............ | H02K 11/38 310/71 |
| 2021/0242754 A1* | 8/2021 | Yamaura .............. | H01R 39/383 |

FOREIGN PATENT DOCUMENTS

| | | |
|---|---|---|
| DE | 10-2005-055740 A1 | 6/2006 |
| JP | 10-225048 A | 8/1998 |
| JP | 2000-175396 A | 6/2000 |
| JP | 2009-033956 A | 2/2009 |
| JP | 2010057293 A | 3/2010 |
| JP | 2011-234490 A | 11/2011 |
| JP | 2013207886 A | 10/2013 |

* cited by examiner

*Primary Examiner* — Eric Johnson
(74) *Attorney, Agent, or Firm* — Novick, Kim & Lee PLLC; Jae Youn Kim (57) ABSTRACT

An electric actuator assembly is proposed. The electric actuator assembly includes: a brush card assembly provided with a brush card part in which a plurality of terminals is molded through insert injection molding; a motor assembly coupled to the brush card assembly and electrically connected thereto; a housing provided with a coupling part into which the brush card assembly is inserted, having a circuit board provided with a connector, and having a gear assembly for receiving power from the motor assembly and transmitting the power to outside, the circuit board and the gear assembly being installed in the housing, wherein terminal holes through which the plurality of terminals passes and a coupling hole into which a part of the brush card part is inserted are separately provided in the coupling part.

7 Claims, 9 Drawing Sheets

ELECTRIC ACTUATOR ASSEMBLY WITH A BRUSH CARD ASSEMBLY

CROSS REFERENCE TO RELATED APPLICATION

The present application claims priority to Korean Patent Application No. 10-2019-0149069, filed Nov. 19, 2019, the entire contents of which is incorporated herein for all purposes by this reference.

BACKGROUND OF THE INVENTION

Field of the Invention

The present disclosure relates to an electric actuator assembly and, more particularly, to an electric actuator assembly provided with a brush card assembly in which terminals are molded through insert injection molding.

Description of the Related Art

An electric actuator assembly is a device that converts a driving force generated from a motor into a linear motion or a rotational motion, wherein torque of the motor rotates a rotating shaft to cause the rotational motion, whereby the torque, a rotational direction, and others are changed and output through a gear assembly.

Electric actuator assemblies are widely used in vehicles because of easier control and better miniaturizing capability than those of actuators using pneumatic or hydraulic pressure.

For example, an electric actuator assembly may be used as a driving source for operating a sunroof device installed on a ceiling of a vehicle. In the sunroof device, a roof panel that opens and closes the ceiling of the vehicle is mechanically connected to an output shaft of the electric actuator assembly by a gear or pulley to perform the opening and closing operation.

Although such an electric actuator assembly may be manufactured in a smaller size than that of a pneumatic or hydraulic actuator, so as to have high space utilization, further miniaturization of the electric actuator assembly is required because the sunroof device is installed in a limited space.

In addition, as being miniaturized, the electric actuator assembly is vulnerable to vibrations generated from the outside, and thus there is a need for an additional structure to more securely fix the terminals extending from the motor.

Documents of Related Art (Patent Document 1) Japanese Patent Application Publication No. 2011-234490

SUMMARY OF THE INVENTION

The present disclosure is to solve the problems of the related art as described above, and an objective of the present disclosure is to provide an electric actuator assembly in which terminals are molded through insert injection molding in a brush card.

Another objective of the present disclosure is to provide an electric actuator assembly in which terminals extending from a brush card are supported by a housing.

According to the features of the present disclosure for achieving the objectives as described above, the present disclosure is provided with an electric actuator assembly including: a brush card assembly provided with a brush card part in which a plurality of terminals is molded through insert injection molding; a motor assembly coupled to the brush card assembly and electrically connected thereto; and a housing provided with a coupling part into which the brush card assembly is inserted, having a circuit board provided with a connector, and having a gear assembly for receiving power from the motor assembly and transmitting the power to outside, the circuit board and the gear assembly being installed inside the housing, wherein terminal holes through which the plurality of terminals pass and a coupling hole into which a part of the brush card part is inserted are separately provided in the coupling part.

The brush card part may include: a component seating part integrally provided with the plurality of terminals molded through the insert injection molding, the component seating part having an installation space formed such that a first side thereof is open; and an insertion column provided with a shaft insertion hole communicating with the installation space in the component seating part, the insertion column protruding in a cylindrical shape, wherein the plurality of terminals may extend parallel to a direction in which the insertion column protrudes.

Each of the plurality of terminals may include: a contact part extending parallel to the insertion column from the component seating part; a body extending perpendicular to an extending direction of the contact part and integrally formed with the component seating part; and a connection part being perpendicular to an extending direction of the body, extending parallel to the contact part, and being in electrical contact with the motor assembly.

Each body of the plurality of terminals may be formed in an arc shape, and at least two or more bodies of the terminals may be gathered to form a circle along an edge of the installation space.

The housing may include: a lower body having a lower space formed therein and in which the circuit board and the gear assembly are seated in the lower space; and an upper body having an upper space formed therein communicating with the coupling hole by being integrally formed with the coupling part, the upper body being coupled to the lower body, wherein in the upper space, a plurality of support ribs may protrude adjacent to the coupling part to support a plurality of contact parts respectively passing through the terminal holes.

The plurality of support ribs may protrude toward the lower body from a lower surface of the upper space, and a receiving slit in close contact with an associated one of the contact parts may be formed at a front end of each of the plurality of support ribs.

The receiving slit may be configured to have a width equal to or smaller than a width of the contact part.

At least one of the plurality of support ribs may be provided with a through slit through which the contact part passes, and the contact part passing through the through slit may be seated in the receiving slit of another support rib and may be supported by the receiving slit.

A plurality of fork terminals may be provided on the circuit board to contact with the contact parts seated on the plurality of support ribs.

The electric actuator assembly according to the present disclosure as shown above has the following effects.

In the present disclosure, since the terminals are not separately assembled to the brush card but are molded in the brush card through insert injection molding, there is no need for the terminals to be separately attached thereto, so that the volume occupied by the terminals is reduced. Accordingly, there is an effect of reducing the space occupied by the electric actuator assembly.

In the present disclosure, since the terminals are molded through insert injection molding in the brush card and integrated, and a plurality of support ribs formed in a coupling part of a housing supports the terminals, there is no need for a holder for fixing the terminals to the brush card. Accordingly, there is an effect in that the number of components decreases, thereby improving assembly performance and reducing assembly workload.

In the present disclosure, the plurality of support ribs is formed in an upper housing, and each of the terminals of the brush card assembly is fixed once by the coupling part of the upper housing and is fixed again by each of the receiving slits formed in each of the support ribs. Accordingly, since a plurality of terminals is fixed twice by the upper housing, the terminals are relatively unaffected by external vibrations, thereby increasing coupling stability.

In the present disclosure, as long as the brush card assembly is fitted to the coupling part of the housing in accordance with the shape of a terminal hole, there is an effect in that each of the terminals is naturally fixed by each of the support ribs and comes into contact with each of fork terminals of a circuit board, thereby simplifying the assembly.

In addition, since pressing force applied to enable the circuit board and the terminals to contact with each other during the assembly is minimized, damage to the terminals of the brush card assembly and damage to the fork terminals of the circuit board is prevented, thereby improving contact reliability between the terminals.

DETAILED DESCRIPTION OF THE INVENTION

Hereinafter, some exemplary embodiments of the present disclosure are described in detail with reference to the accompanying drawings. In adding reference numerals to the components of each drawing, it should be noted that the same reference numerals are used to refer to the same components as much as possible even if displayed on different drawings. Further, in the following description, if it is decided that the detailed description of a known function or configuration related to the disclosure makes the subject matter of the disclosure unclear, the detailed description is omitted.

Further, when describing the components of the present disclosure, terms such as first, second, A, B, (a) or (b) may be used. Since these terms are provided merely for the purpose of distinguishing the components from each other, they do not limit the nature, sequence, or order of the components. If a component is described as being "connected", "coupled", or "linked" to another component, that component may be directly connected or connected to that other component. However, it should be understood that yet another component between each of the components may be "connected", "coupled", or "linked" to each other.

An electric actuator assembly according to the present disclosure may be applied to various actuators used in automobiles, for example, a sunroof opening and closing device, a power transmission device of an automatic footrest, or a power transmission device for front and rear operation of a seat.

First, a configuration of the electric actuator assembly constituting a preferred exemplary embodiment of the present disclosure will be described.

Figure 1:
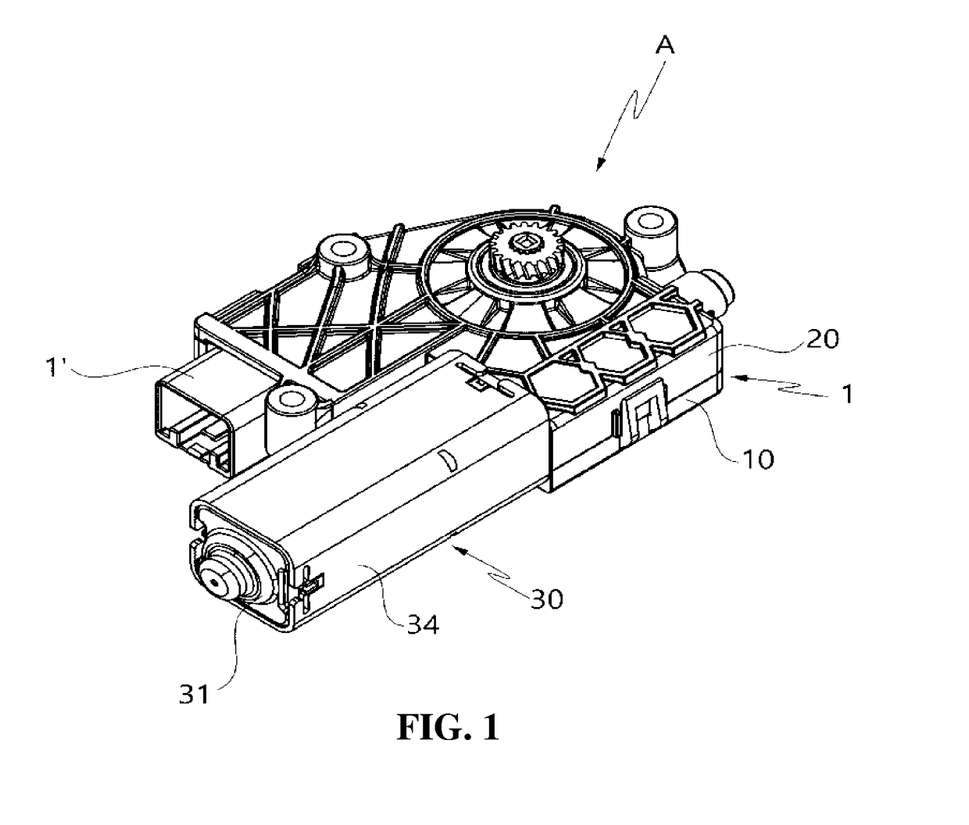
FIG. 1 is a perspective view showing an exemplary embodiment of an electric actuator assembly according to the present disclosure.

Referring to FIG. 1, an electric actuator assembly (hereinafter, actuator A) according to the exemplary embodiment of the present disclosure is shown. The actuator A is formed by coupling a motor assembly 30 to a housing 1 in which a connector 1' is formed.

The housing 1 roughly has an exterior appearance that is bent in an inverted capital letter 'L' shape. The connector 1' is formed on a bent front end of the housing 1, a rotating shaft 33 is inserted in a direction parallel to the direction in which the connector 1' is directed, and the motor assembly 30 is assembled with the housing 1.

Figure 2:
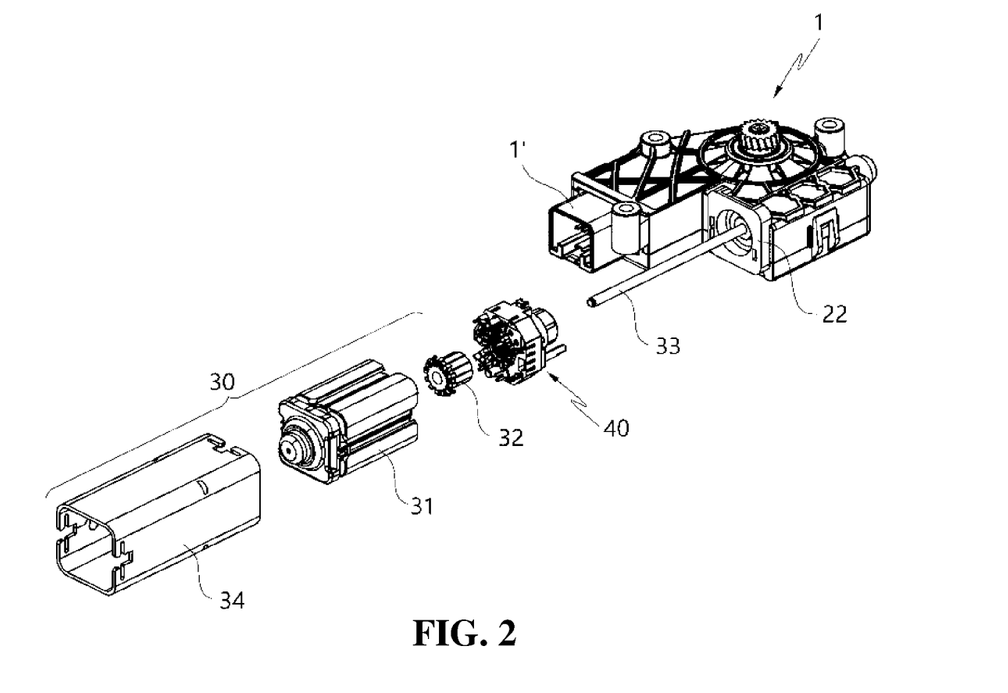
FIG. 2 is an exploded perspective view of the electric actuator assembly of the exemplary embodiment of the present disclosure.
Figure 3:
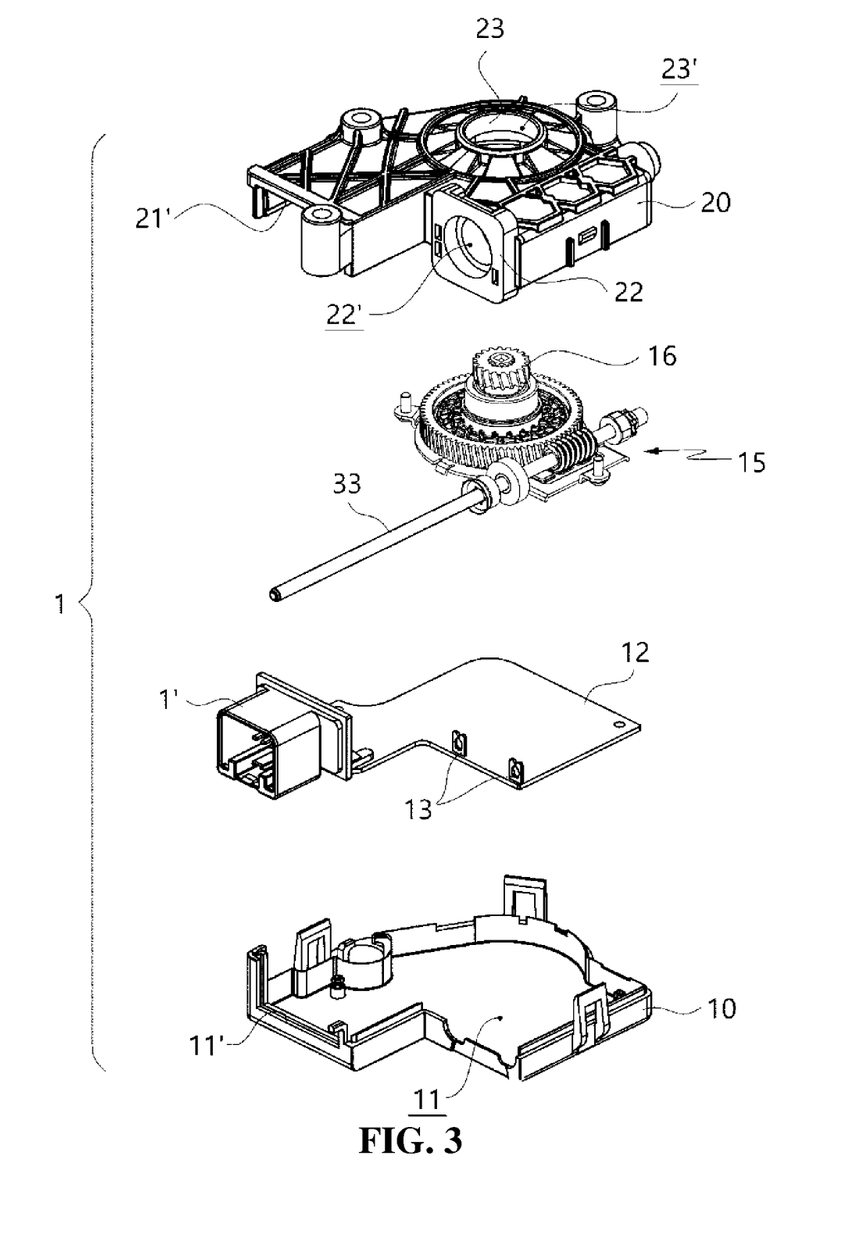
FIG. 3 is an exploded perspective view showing each component of a housing constituting the exemplary embodiment shown in FIG. 2 by disassembling the component.

The housing 1 is formed by coupling a lower body 10 and an upper body 20 to each other. The lower body 10 has a lower space 11 therein, and a lower connector seating end 11' is formed at a position corresponding to the connector 1', thereby supporting a first side of the connector 1'.

A circuit board 12 is seated in the lower space 11. The circuit board 12 is also formed in an inverted capital letter 'L' shape similar to the exterior appearance of the housing 1, and the connector 1' is provided at the front end of the circuit board 12. When the circuit board 12 is seated in the lower space 11, the connector 1' is seated in the lower connector seating end 11' of the lower body 10.

The circuit board 12 is provided with a fork terminal 13 to receive and transmit power and various control signals from the connector 1' to a rotary motor 31. The fork terminal 13 is in electrical contact with a terminal protruding due to the fact that the motor assembly 30 is assembled. The shape and number of the fork terminals 13 are provided to correspond to the shape and number of the terminals protruding from the motor assembly 30.

A gear assembly 15 is seated on the circuit board 12. The gear assembly 15 includes an output gear 16, and the gear assembly 15 rotates by receiving a driving force from the motor assembly 30 and transmits and operates the driving force to a final driving device (such as a sunroof, a vehicle footrest) through the output gear 16.

The upper body 20 is coupled to the lower body 10 to shield the lower space 11. The upper body 20 is formed in an inverted capital letter 'L' shape to correspond to the housing 1. The upper body 20 has an upper space 21. The upper space 21 accommodates each of upper ends of the circuit board 12 and gear assembly 15, which are seated in the lower space 11. The lower space 11 and the upper space 21 meet to form a space in which components are installed in the housing 1.

On the upper body 20, an upper connector seating end 21' is provided at a position corresponding to the lower connector seating end 11'. When the lower body 10 and the upper body 20 are coupled to each other, the lower connector seating end 11' and the upper connector seating end 21' are coupled to each other while surrounding the connector 1'.

Figure 4:
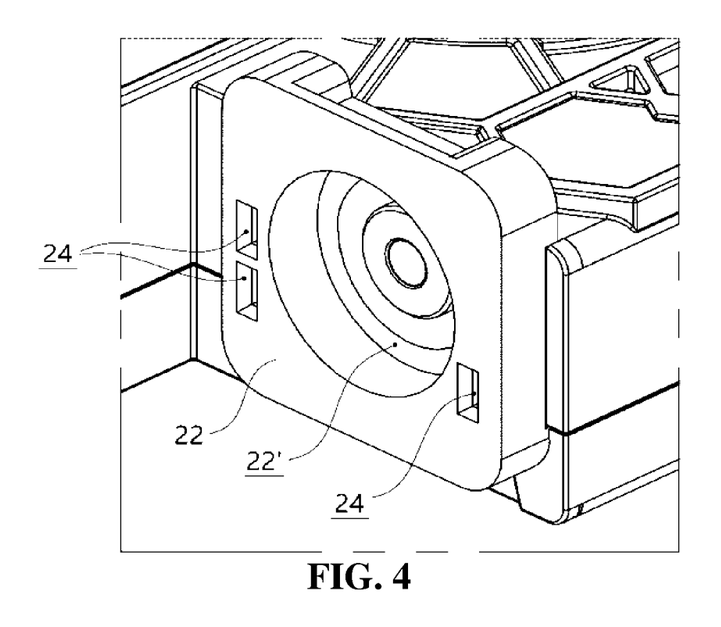
FIG. 4 is an enlarged perspective view showing a featured part of the housing constituting the exemplary embodiment of the present disclosure.

The upper body 20 is provided with a coupling part 22. A brush card assembly 40 assembled to the motor assembly 30 is coupled to the coupling part 22. A coupling hole 22' is formed in the coupling part 22, and an insertion column 42 of the brush card assembly 40 is inserted through the coupling hole 22'.

Figure 5:
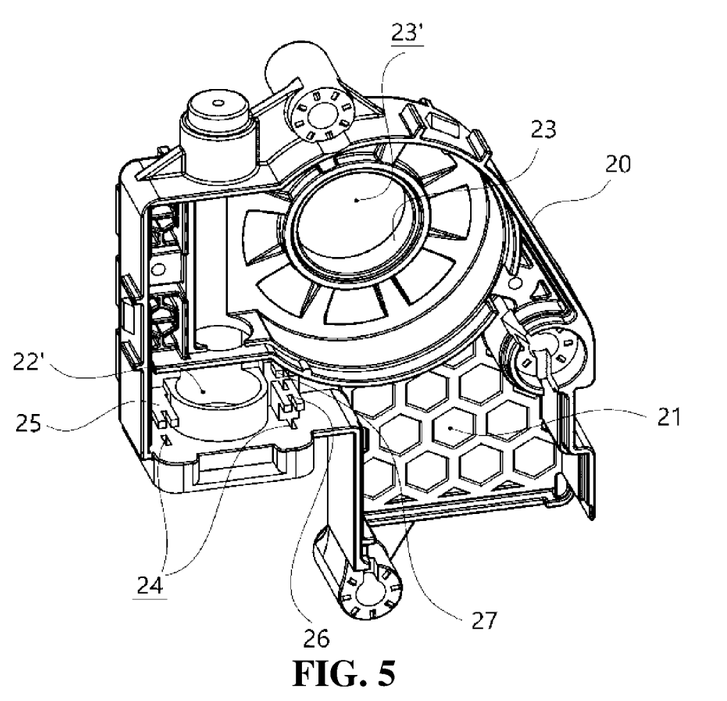
FIG. 5 is a perspective view showing an upper housing constituting the exemplary embodiment of the present disclosure.

The coupling part 22 has a square shape being able to contact the brush card assembly 40, and the coupling hole 22' having a circular shape is formed in the center of the coupling part. As shown in FIG. 5, the coupling part 22 is formed such that a cylindrical sleeve (with no shown reference numeral) is formed concave inside the upper space 21, so that a passage of the coupling hole 22' may be formed. The coupling hole 22' is open in a direction parallel to the direction in which the connector 1' is formed, so that the motor assembly 30 is assembled parallel to the connector 1'.

A plurality of terminal holes 24 is formed in the coupling part 22 along the edge of the coupling hole 22'. Each of the terminals connected to and extending from the motor assembly 30 is inserted into and fixed to each of the terminal holes 24. The terminal hole 24 has the same shape as the cross-sectional shape of the terminal, and is in close contact with the outer surface of the terminal.

An output part 23 is formed in the upper body 20 in a direction perpendicular to the direction in which the coupling hole 22' of the coupling part 22 is directed. Through the output part 23, the driving force generated from the motor assembly 30 passes through the gear assembly 15 and is transmitted to the driving device.

A through hole 23' is formed in the output part 23. The through hole 23' is formed to face in a direction perpendicular to the direction in which the coupling hole 22' of the coupling part 22 is directed. An output shaft (not shown) connected to the gear assembly 15 and others may be connected thereto through the through hole 23'.

Figure 6:
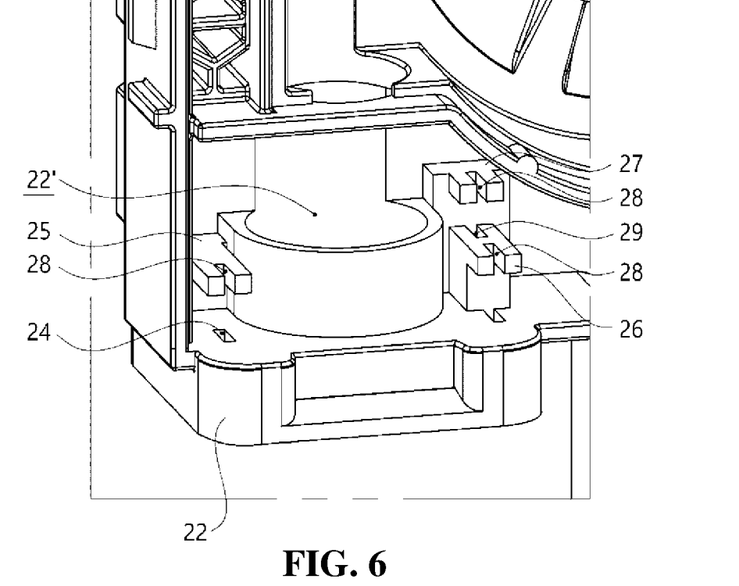
FIG. 6 is an enlarged perspective view showing the featured part of the upper housing constituting the exemplary embodiment of the present disclosure.

Referring to FIG. 6, a plurality of support ribs protrudes adjacent to the coupling part 22 in the upper space 21 of the upper body 20. Each of the support ribs supports each of the terminals that has passed through each of the terminal holes 24 and has entered the upper space 21. The support ribs protrude toward an open surface of the upper space 21 from a lower surface of the upper space 21. The plurality of support ribs includes a first support rib 25, a second support rib 26, and a third support rib 27. The number of support ribs is provided to correspond to the number of terminals connected to the motor assembly 30.

Each of receiving slits 28 is formed in the first support rib 25 to third support rib 27 so that the front end of each terminal passing through each terminal hole 24 is seated in each receiving slit 28. The receiving slit 28 is formed in the longitudinal direction of the support rib from the front end of the support rib. It is preferable that the receiving slit 28 is formed by having a width equal to or smaller than the width of the terminal so as to apply a pressing force to the extent sufficient to press and fix the outer surface of the terminal to the receiving slit 28.

Meanwhile, the second support rib 26 and the third support rib 27 are formed at the same position in the upper space 21 differently only in height. In this way, when at least two or more support ribs are formed differently only in height, a through slit 29 through which the terminal may pass is formed in the support rib on the side closer to the coupling part 22. In FIG. 6, a receiving slit 28 is formed at the front end of the second support rib 26, and the through slit 29 is formed from a lower surface side of the upper space 21.

The motor assembly 30 may be configured to include the brush card assembly 40, but in the present disclosure, since the main feature is in the brush card assembly 40, the motor assembly 30 and the brush card assembly 40 will be described by distinguishing therebetween.

The motor assembly 30 includes a rotary motor 31, a commutator 32, a rotating shaft 33, and a yoke 34. In the motor assembly 30, the rotary motor 31 generates a rotational force to rotate the rotating shaft 33, and a worm gear coupled to the front end of the rotating shaft 33 transmits the driving force to the gear assembly 15.

In the rotary motor 31, a rotor assembly provided with a plurality of magnets and a stator assembly on which coils are wound are rotatably coupled to each other, and when power is applied to the stator assembly, the rotational force is generated.

The rotating shaft 33 is inserted in the center of the rotary motor 31 to rotate together with the stator assembly, and transmits the driving force to the outside through the worm gear coupled to the front end of the rotating shaft 33.

The commutator 32 may be further installed on the rotating shaft 33. The commutator 32 serves to change a direction of the current applied to the coil.

The rotary motor 31 is surrounded by the yoke 34. In FIG. 2, the yoke 34 and the rotary motor 31 are shown as being formed separately, but in fact, the magnets of the rotor assembly are attached to the inner side of the yoke 34, and the stator assembly is rotatably assembled inside the rotor assembly. The yoke 34 is made of metal. The yoke 34 serves as a passage for a magnetic line of force generated in the rotor assembly and blocks noise that may affect the stator assembly.

The brush card assembly 40 is assembled to the motor assembly 30 and electrically connected thereto. The brush card assembly 40 is formed through insert injection molding of an EMC filter, which is made of a choke coil and a capacitor, and a terminal inside the brush card part 41.

Figure 7:
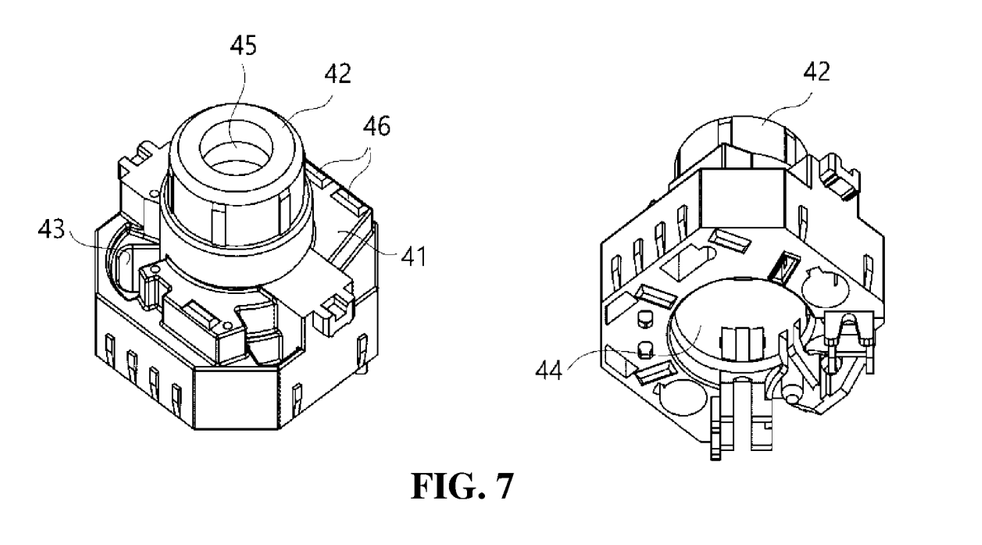
FIG. 7 is a perspective view showing a brush card part of a brush card assembly constituting the exemplary embodiment of the present disclosure.

Referring to FIG. 7, a component seating part 43 and an insertion column 42 form an exterior appearance of the brush card part 41. The component seating part 43 roughly has a hexahedral shape, and the EMC filter and the terminal are seated therein. The EMC filter and the terminal are integrally formed through insert injection molding when the brush card part 41 is molded. An installation space 44 is formed in the component seating part 43. In the installation space 44, the commutator 32 of the motor assembly 30 is installed, so that the motor assembly 30 and the brush card assembly 40 are coupled and electrically connected to each other.

The insertion column 42 protrudes in a cylindrical shape from the center of the component seating part 43. The insertion column 42 is provided with a shaft insertion hole 45 into which the rotating shaft 33 is inserted. The shaft insertion hole 45 is formed to communicate with the installation space 44. The insertion column 42 is inserted into the coupling hole 22' of the coupling part 22 to enter the upper space 21 of the upper body 20, and the component seating part 43 is in close contact with the outer surface of the coupling part 22.

Exposed parts 46 are formed in the component seating part 43. Each of the terminals that is molded through insert injection molding penetrates the component seating part 43 and is exposed through each of the exposed parts 46. The terminals exposed from the component seating part 43 extend parallel to the insertion column 42. The number of the exposed part 46 is provided to correspond to the number of terminals coupled to the component seating part 43.

Figure 8:
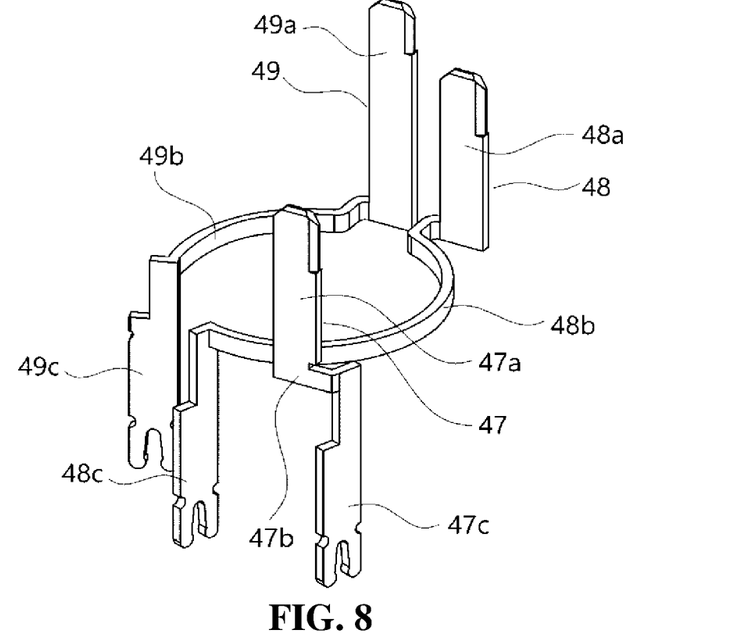
FIG. 8 is a perspective view showing terminals of the brush card assembly constituting the exemplary embodiment of the present disclosure.

FIG. 8 shows a plurality of terminals integrally formed with the brush card part 41. The plurality of terminals serves to transmit power for the rotary motor 31, ground, signals from various sensors, and others to the rotary motor 31. In the present exemplary embodiment, the plurality of terminals includes a first terminal 47, a second terminal 48, and a third terminal 49.

The first terminal 47, the second terminal 48, and the third terminal 49 are commonly composed of a contact part, a body, and a connection part. Each of the contact part extends parallel to the insertion column 42 through each of the exposed part 46 of the component seating part 43. Each contact part is electrically connected to the circuit board 12 by passing through the coupling part 22.

Each body is a part that is integrally molded through insert injection molding in the component seating part 43 of the brush card part 41. The body is formed in an arc shape so as to be bent in a direction perpendicular to the contact part and formed along the edge of the installation space 44 formed in the component seating part 43. At least two or more of a first body 47b, a second body 48b, and a third body 49b may be disposed to form a circle along the edge of the installation space 44.

Each connection part is bent in a direction perpendicular from the body and extends toward the motor assembly 30 from the component seating part 43. Specifically, the connection part is parallel to the contact part, but each of the directions extends to face opposite side from each other. Each connection part is electrically connected to the rotary motor 31 to transmit various control signals.

Next, an assembly process of the electric actuator assembly constituting the preferred exemplary embodiment of the present disclosure will be described.

As shown in FIG. 3, the circuit board 12 and the gear assembly 15 are disposed between the lower body 10 and the upper body 20. The circuit board 12 and the gear assembly 15 are seated in the lower space 11 of the lower body 10, and the upper body 20 shields the lower space 11. At this time, the connector 1' is exposed to the outside while being enclosed by the lower connector seating end 11' and the upper connector seating end 21', and the gear assembly 15 is seated in the lower space while also including the worm gear which is in a state of being not connected to the rotating shaft 33.

The motor assembly 30 is coupled to the brush card assembly 40. Specifically, the rotating shaft 33 is inserted into the center of the rotary motor 31 and the commutator 32, and the commutator 32 is inserted into the installation space 44 of the brush card assembly 40. The rotating shaft 33 passes through the insertion column 42 through the shaft insertion hole 45. When the rotary motor 31, the commutator 32, the rotating shaft 33, and the brush card assembly 40 are assembled, the yoke 34 is coupled to the outer side of the rotary motor 31.

Meanwhile, in the brush card assembly 40, the EMC filter and the plurality of terminals are integrally formed through insert injection molding. Therefore, since the plurality of terminals is positioned inside the brush card part 41, the volume occupied by the terminals itself is reduced, and since the brush card assembly 40 acts as one component, the number of components decreases, thereby reducing the assembly workload.

Figure 9:
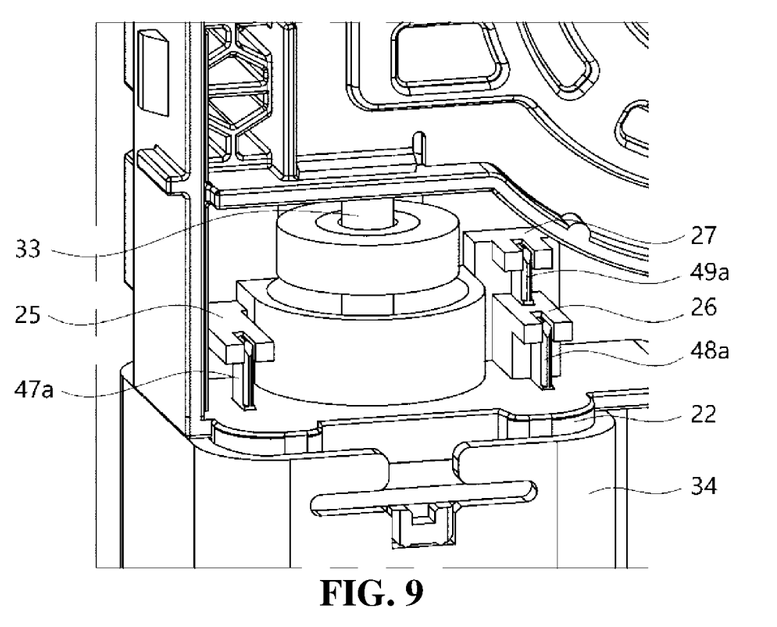
FIG. 9 is an enlarged perspective view showing a state in which a motor assembly and the brush card assembly are coupled to the upper housing constituting the exemplary embodiment of the present disclosure.

When the motor assembly 30 and the brush card assembly 40 are assembled, the insertion column 42 of the brush card assembly 40 is inserted into the coupling hole 22' of the coupling part 22. The rotating shaft 33 is coupled to the worm gear, and each of the first terminal 47 to the third terminal 49 extending from the component seating part 43 passes through each terminal hole 24 of the coupling part 22, and is respectively seated in each of the receiving slits 28 of the first support rib 25 to the third support rib 27.

Figure 10:
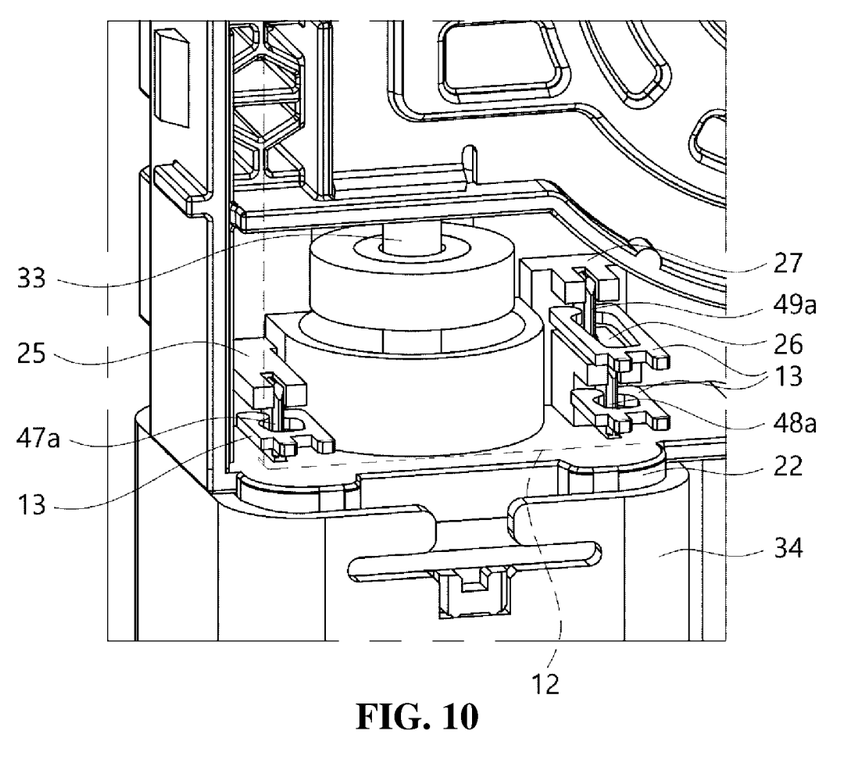
FIG. 10 is an enlarged perspective view showing a state in which a circuit board is coupled to the featured part shown in FIG. 9.

In the process of coupling the motor assembly 30 and the brush card assembly 40 to the housing 1, as shown in FIG. 10, after passing through each of the terminal holes 24, each of the first contact part 47a to the third contact part 49a is in contact with each of the fork terminals 13 of the circuit board 12.

At this time, the width of the receiving slit 28 is equal to or smaller than the width of the terminal so that the inner surface of the support rib is in close contact with the terminal with a predetermined pressing force. Each of the plurality of terminals is primarily supported by the inner surface of each of the terminal holes 24 of the coupling part 22, and is secondarily supported by each of the first support rib 25 to the third support rib 27, thereby increasing coupling stability of the terminals.

Referring to FIG. 9, the second contact part 48a and the third contact part 49a are at the same position in the upper space 21, but are disposed differently only in height. Accordingly, the through slit 29 is formed in the second support rib 26 at a relatively close position from the coupling part 22 so that the contact part of the third terminal 49 passes through the through slit 29 and is seated on the third support rib 27. Accordingly, the second support rib 26 substantially supports the second contact part 48a and the third contact part 49a, and the third support rib 27 may become an additional means to additionally prevent vibration that may occur from the front end of the third contact part 49a.

In the description above, although the components of the exemplary embodiments of the present disclosure may have been explained as assembled or operatively connected to each other as a unit, the present disclosure is not intended to be limited to such exemplary embodiments. That is, within the scope of the present disclosure, all of the components may be selectively combined and operated in any numbers. In addition, the terms "comprise", "include", or "have" described above mean that the corresponding component may be inherent unless otherwise stated, and thus should be construed to further include other components and not to exclude other components. That is, terms like "include", "comprise", and "have" should be interpreted in default as inclusive or open rather than exclusive or closed unless expressly defined to the contrary. In the following description, unless otherwise defined, all terms including technical and scientific terms used herein have the same meaning as commonly understood by one of those skilled in the art to which this disclosure belongs. Commonly used terms, such as predefined terms, should be interpreted as being consistent with the contextual meaning of the related art, and are not to be interpreted as ideal or excessively formal meanings unless explicitly defined in the present disclosure.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present disclosure are not intended to limit the technical idea of the present disclosure but to describe the present disclosure, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. An electric actuator assembly comprising:
   a brush card assembly provided with a brush card part in which a plurality of terminals is molded through insert injection molding;
   a motor assembly coupled to the brush card assembly and electrically connected thereto; and
   a housing provided with a coupling part into which the brush card assembly is inserted, having a circuit board provided with a connector, and having a gear assembly for receiving power from the motor assembly and transmitting the power to outside, the circuit board and the gear assembly being installed inside the housing,
   wherein terminal holes through which the plurality of terminals passes and a coupling hole into which a part of the brush card part is inserted are separately provided in the coupling part, and
   wherein the housing comprises:
   a lower body having a lower space formed therein and in which the circuit board and the gear assembly are seated in the lower space; and
   an upper body having an upper space formed therein communicating with the coupling hole by being integrally formed with the coupling part, the upper body being coupled to the lower body, wherein in the upper space, a plurality of support ribs protrudes adjacent to the coupling part to support a plurality of contact parts respectively passing through the terminal holes, and
   a receiving slit in close contact with an associated one of the contact parts is formed at a front end of each of the plurality of support ribs,
   wherein at least one of the plurality of support ribs is provided with a through slit through which the contact part passes, and
   the contact part passing through the through slit is seated in the receiving slit of another support rib and is supported by the receiving slit.

2. The electric actuator assembly of claim 1, wherein the brush card part comprises:
   a component seating part integrally provided with the plurality of terminals molded through the insert injection molding, the component seating part having an installation space formed such that a first side thereof is open; and
   an insertion column provided with a shaft insertion hole communicating with the installation space in the component seating part, the insertion column protruding in a cylindrical shape, wherein the plurality of terminals extends parallel to a direction in which the insertion column protrudes.

3. The electric actuator assembly of claim 2, wherein each of the plurality of terminals comprises:
   a contact part extending parallel to the insertion column from the component seating part;
   a body extending perpendicular to an extending direction of the contact part and integrally formed with the component seating part; and
   a connection part being perpendicular to an extending direction of the body, extending parallel to the contact part, and being in electrical contact with the motor assembly.

4. The electric actuator assembly of claim 3, wherein
   each body of the plurality of terminals is formed in an arc shape, and
   at least two or more bodies of the terminals are gathered to form a circle along an edge of the installation space.

5. The electric actuator assembly of claim 1, wherein the plurality of support ribs protrudes toward the lower body from a lower surface of the upper space.

6. The electric actuator assembly of claim 5, wherein the receiving slit is configured to have a width equal to or smaller than a width of the contact part.

7. The electric actuator assembly of claim 1, wherein a plurality of fork terminals is provided on the circuit board to contact with the contact parts seated on the plurality of support ribs.

* * * * *